Sept. 18, 1951   J. H. JOHNSON   2,568,398
SEAT COVER FASTENING MEANS
Filed Feb. 12, 1949

Inventor
JAMES H. JOHNSON
Attorney

Patented Sept. 18, 1951

2,568,398

UNITED STATES PATENT OFFICE 2,568,398

SEAT COVER FASTENING MEANS

James H. Johnson, Alpena, Mich., assignor to Fraser Products Company, Alpena, Mich., a corporation of Michigan Application February 12, 1949, Serial No. 76,038

2 Claims. (Cl. 155—182)

This invention relates in general to means for securing seat covers upon automobile seat cushions which means make said seat covers easy to fit and install, and extremely flexible in use.

The presently known means for securing seat covers to automobile seat cushions, particularly the removable type of cushions, have not proven satisfactory for at least two important reasons.

In the first place, the installation of seat, or cushion, covers with present securing means is difficult and slow, thereby increasing substantially the total cost of the installed covers. Often, in order properly to position a cushion cover upon a cushion, it is necessary to adjust or remove completely the cover several times during the installation thereof, because the securing means permits little or no flexibility in movement of the cover after the installation with respect to that part, such as the frame of the seat, upon which the said securing means is anchored. In present practice, the cover manufacturing companies prepare elaborate drawings showing preferred manner of installation and send field representatives to call on dealers and instruct them in the proper and best methods of making installations. However, even these precautions do not eliminate the expense and rigidity of present types of installations.

Further, by reason of this same lack in flexibility, the second major objection to said present securing means arises. It has always been desirable, but never completely attainable, to install cushion covers so that a depression of the cushion cover, hence the cushion, at one point thereon would not create wrinkles in or distortion of the cover in other portions thereof. This problem has been especially acute where the cushion is depressed by a heavy person and this problem has been especially noticeable where the bottom of the frame, or the base supporting the cushion, is irregular in shape. Such irregularities in shape have defied the successful use of any presently known securing means to attach flexibly a seat cover to the frame of the seat. In fine covers, carefully tailored to fit a given type of seat, this problem has been especially baffling since the very care in tailoring accentuated the wrinkling and stretching which occurred in normal use.

Therefore, the need has become apparent for an improved securing means which will substantially decrease the time required to install automobile cushion covers, and which at the same time will permit substantial flexions of the seat cover with respect to the frame of the seat. Attempts in this direction occurring to date have dealt with one phase or the other of this problem but none to my knowledge have solved both.

Accordingly, a primary object of this invention is the provision of means for securing seat covers to automobile cushions whereby the time required to install said cushion covers may be materially reduced.

A further object of this invention is the provision of securing means, as aforesaid, permitting substantial movement of said cover with respect to the seat frame, whereby said seat covers will automatically tend to cling to the contour of the seat cushion when uneven loads are placed thereon, even though only moderate care is observed in the installation of the covers.

A further object of this invention is the provision of securing means, as aforesaid, which can be used completely effectively in spite of irregularities either in the bottom of the cushion frame or the cushion support base.

A further object of the invention is to provide means which will improve the flexibility of the installed cover while at the same time reducing its final cost.

Other objects and purposes of this invention will become apparent to persons familiar with this type of equipment upon referring to the accompanying drawings and upon reading the following specification.

I have solved these difficulties and have attained the objects and purposes above mentioned, as well as others incidental thereto and associated therewith, by an extremely simple construction. Such construction slightly increases the cost of the cover to the dealer but it so reduces the installation cost that the final cost to the user may be materially lowered. My invention comprises first the provision of a plurality of spaced metal grommets along the lower edge of the skirt of the cushion cover. I then provide a plurality of resilient fasteners, each comprised of a pair of hooks slidably secured to an elastic ring, of which one hook is inserted through one of said grommets and the other hook thereof is anchored on the bottom of the seat cushion frame at any convenient point.

For illustrations of a preferred embodiment of the invention, attention is directed to the accompanying drawings in which.

*Construction*

Figure 5:
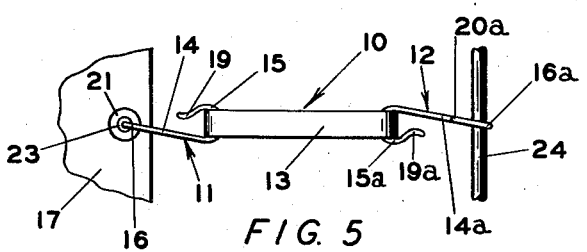
Figure 5 is a fragmentary, enlarged view of Figure 1 showing a single, complete resilient fastener.
Figure 4:
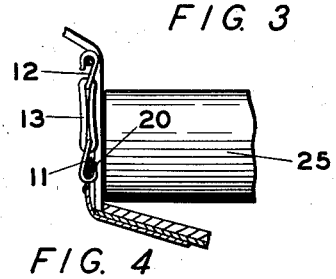
Figure 4 is a fragmentary, enlarged view of a portion of Figure 3.

One preferred embodiment of the fastening means 10 (Figures 4 and 5), to which this invention relates, is comprised of a pair of hooked links 11 and 12, hereinafter for convenience referred to frequently as "cover" link and "frame" link, respectively, removably and slidably supported upon a single elastic ring 13.

Figure 3:
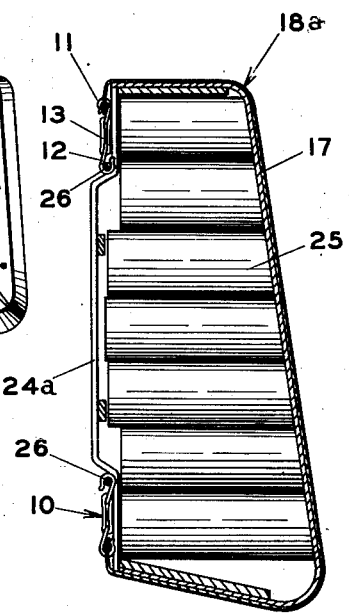
Figure 3 is a sectional view taken along the line III—III of Figure 2.
Figure 6:
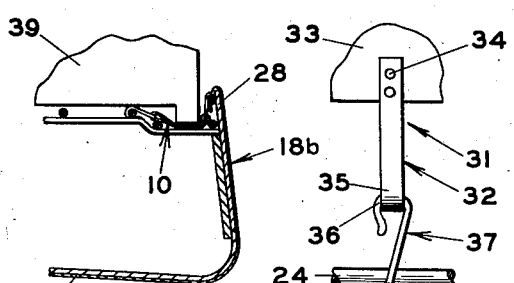
Figure 6 is a fragmentary, sectional view of a portion of an alternate seat cushion structure including my resilient fastener, said seat cushion being shown in inverted position.
Figure 7:
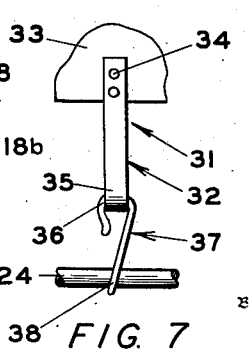
Figure 7 is a fragmentary view of a cushion cover with an alternative form of my means for securing said cover to the cushion frame.

In said preferred embodiment the hooked links 11 and 12 are substantially identical in shape and are fabricated from wire of appropriate gauge and strength. It has been found as result of considerable experimentation that galvanized steel wire ranging in gauge from 14 to 20 gauge, inclusive, is satisfactory and that 18 gauge wire is preferable. It has also been found that, although the length of the links may range from 7/8 to 1 1/4 inch, they are preferably about 1 inch long. Each link is comprised of a link shank 14 with hooks 15 and 16 at opposite ends thereof. The hook 15 of the link 12 defines a plane substantially perpendicular to a plane defined by the hook 16, and the said shank 14 preferably lies within both of said planes. Accordingly, the hook 15a of the link 11 defines a plane substantially perpendicular to a plane defined by the hook 16a, and the shank 14a lies substantially within both of said latter planes. This relative positioning of the hooks permit the rubber ring 13 to lie flat against the seat cushion bottom. This gives the fastening means 10 a maximum of freedom from binding against parts of the seat bottom or seat support 39, which is particularly desirable where the said ring is required to lie on a curve, such as shown in Figure 6, or as would be the case if the hooks were fastened to the irregular part of the seat bottom shown in Figure 3. Although, as hereinafter mentioned in more detail, each of the hooks are pinched closely enough together at their ends that they will not shake out of position, the tips 19 of the hooks are preferably flared for ease in inserting said hooks into place.

The elastic ring 13 is preferably, but not necessarily, made from rubber treated with an aging material of a conventional type well known in the rubber industry, which aging material causes said ring to retain its elasticity, even when held stretched up to one hundred and fifty per cent of its normal length, for as much as two years. The cross-sectional dimension of the elastic ring will be governed by the force which said ring is intended to impose when under tension. In this particular embodiment of the invention the elastic ring is two inches long and made from material 1/8 inch thick and 7/16 inch wide. Its resiliency is such that at one hundred per cent elongation it will exert a total force of five pounds, or, in other words, at such elongation each band will exert a force of about 130 pounds per square inch.

The hooks 15 and 15a, which in this particular case removably engage the elastic ring 13, are preferably so curved that their tips 19 and 19a, respectively, are spaced from their respective shanks 14 and 14a a distance materially less than the width of the elastic ring 13, thereby preventing accidental disengagement of the said hooks 15 and 15a therefrom when the fastening means are subjected to a sudden jolt or shock either before or after installation onto a seat cover.

In a preferred embodiment of this invention, the seat cover 17 (Figure 5) is provided with a plurality of grommets 21 which may be made of metal, plastic, or any other suitable material, said grommets being positioned along the lower free edges of the skirts 22 of the seat cover 17. The said grommets 21 are preferably, but not necessarily, substantially evenly spaced along and adjacent the edges of said seat cover skirts 22 for engagement by one hook, here the hook 16a of each link 11.

These grommets, in a preferred embodiment, are placed about 8 inches apart, but this spacing may vary from about 5 inches to about 10 inches under normal conditions. It is essential, however, that the force exerted by each of the fasteners be maintained relatively light and that there be a relatively large number thereof. Hence, the exact strength and number of fasteners may vary freely, so long as such variance is not materially away from the combination of a flexible edge, a large number of grommets, and a fastener associated with each grommet exerting only a light force, without departing from the scope of this invention.

The tip 19a (Figure 5) of said hook 16a on each frame link 12 is preferably spaced from the shank 14a thereof, so that a moderate force must be exerted to effect a disengagement of said hook 16a from the frame element 24. Thus, ordinary movements of the seat cover 17, either before or after installation, will not produce disengagement of said frame link 12 from the seat frame during normal operation. The tip 20 (Figures 4 and 5) of the hook 16 on the cover link 11 is preferably spaced from the shank 14 so that a moderate positive force must be exerted to effect a disengagement of said hook 16 from the seat cover 17 for reasons mentioned above.

Figure 2:
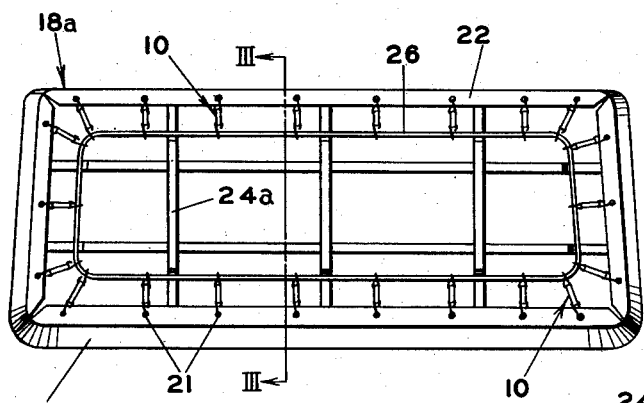
Figure 2 is a top plan view of an alternate seat cushion showing a different application of my resilient fasteners.

If appropriate frame elements 24 engageable by said hooks 16 are not provided on the bottom of the seat cushion, such as the cushions 18a, an anchor rod 26 (Figures 2, 3 and 4) may be welded or otherwise secured to such frame elements 24a as may exist. The hook 16 of each fastening means 10 may then be anchored upon said anchor rod 26 (Figure 2).

Figure 1:
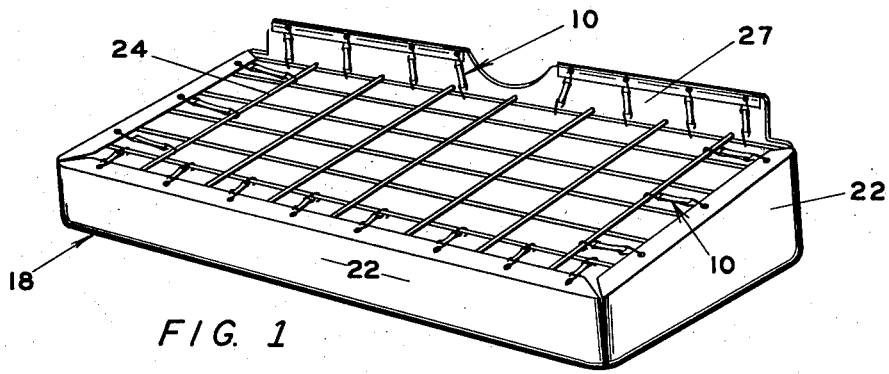
Figure 1 is an oblique view of an inverted seat cushion upon which a cover has been secured with the resilient fastening means to which this invention relates.

Inasmuch as the seat cushions 18, 18a and 18b are intended to be of conventional types, detailed descriptions thereof will be omitted from this application. However, it will be noted that the seat cushion 18a (Figure 2) differs from the seat cushion 18 and 18b (Figures 1 and 6), by virtue of the long riser 27 on seat cushion 18 and the short riser 28 on seat cushion 18b. The seat cushions 18a and 18b differ from the cushion 18 in that they require an anchor rod 26 upon which said hooks 16 may be anchored. Such anchor rod may be welded, or otherwise fastened in any conventional manner, to the seat cushion frame in any position convenient for receiving the respective fastening hooks.

The alternate fastening means 31 may be comprised of a folded elastic strip 32, the extremities of which are brought together and secured directly to the edge of a seat cover 33 by means of rivets 34, or other suitable means, thereby creating a loop portion 35 engageable by the hook 36 at one end of a hooked link 37. A hook 38 at the other end of the hooked link 37 may be engaged with a frame element, such as the frame element 24 on the bottom of the seat cushion 18, as described above. The hooked link 37 may be similar in all respects to the hooked link 12.

*Operation and installation*

The fastening means 10 are preferably already supported upon the seat cover skirts 22 by means of the cover links 11, as described above, before the installation of the seat cover 17 onto a seat. When the seat cover 17 is installed upon a seat cushion, such as the cushion 18 (Figure 1), the frame links 12 are caused to engage the frame elements 24 on the bottom of the seat cushion 18, and the installation is complete. If the seat cushion has a long riser 27, the skirt of the cover along the front of the cushion is folded over the lower edge of said riser and the fastening means 10 holds said skirt in the desired position. If the riser is short, such as the riser 28 on the cushion 18b (Figure 6), the fastening means 10 can be used equally effectively, even though the short riser 28 extends below and overlaps the base 39 supporting the cushion. The fastening means 10 curves around the cushion support base 39 and permits complete freedom of movement of the seat cover with respect to the frame element 24 or anchor rod 26 upon which said fastening means is anchored.

Normally, the order of installation steps will preferably be: first, to engage the hooks at the front of the seat, second, to engage the hooks at the back of the seat, and last, to engage the hooks at the sides of the seat. This, however, is only illustrative and places no limitation onto my invention.

It will be seen that the fastening means 10 permits rapid yet complete and satisfactory installation of tailored seat covers. Yet, such installation of the seat covers is not considered permanent in the same sense of the word as are present types of seat covers as presently installed. This gives rise to the possibility that unupholstered seat cushions may be installed in new automobiles thereby greatly reducing the cost of the car. The padding and springs of the seat cushion could be covered by a plain inexpensive duck material over which the seat covers would be installed. Thus, the owner of the car could change the upholstering of the seat cushions from time to time by simply changing his seat covers.

It is a well known fact that seat covers placed over certain types of upholstering, such as mohair, not only damage the appearance of the upholstering but also create ideal conditions for moths.

Although the above mentioned drawings and description apply to one particular, preferred embodiment of the invention, it is not my intention, implied or otherwise, to eliminate other variations or modifications which do not depart from the scope of the invention unless specifically stated to the contrary in the hereinafter appended claims.

I claim:

1. In means for securing a seat cover with a skirt upon an upholstered, automobile seat cushion, said cushion having a metal frame including a plurality of intersecting, substantially horizontal frame elements across the bottom thereof, the combination comprising: a plurality of spaced grommets through and along the free edge of the skirt of said seat cover, said grommets being spaced apart from each other about eight inches; and a plurality of resilient fasteners each comprised of an elastic, rubber ring expansible to about 150% of its normal length when placed under a strain of about 130 pounds per square inch of cross-sectional area, a cover link having materially perpendicularly disposed hooks at opposite ends thereof, one hook being removably engageable with one of said grommets and the other hook being removably and slidably engageable with said elastic ring, and a frame link having mutually perpendicularly disposed hooks at opposite ends thereof, one hook being removably and slidably engageable with said elastic ring and the other hook being removably engageable with one of said frame elements; whereby said seat cover is constantly urged to cling to said seat cushion but is permitted substantial movement with respect to said frame element.

2. In a means for securing a seat cover to a seat cushion, said means comprising: an elastic, rubber ring; a cover link having perpendicularly disposed hooks at opposite ends thereof, one of said hooks of said cover link removably and slidably engageable with said ring; a frame link having perpendicularly disposed hooks at opposite ends thereof, one of said hooks of said frame link removably and slidably engageable with said ring.

JAMES H. JOHNSON.

REFERENCES CITED

The following references are of record in the file of this patent:

UNITED STATES PATENTS

| Number | Name | Date |
|---|---|---|
| 1,492,993 | Lasecki | May 6, 1924 |
| 1,897,521 | Legarde | Feb. 14, 1933 |
| 2,180,690 | Monroe | Nov. 21, 1939 |